United States Patent
Drew et al.

(10) Patent No.: US 6,237,900 B1
(45) Date of Patent: May 29, 2001

(54) RIGID EVAPORATIVE HEAT EXCHANGERS

(75) Inventors: Brian S. Drew, Neutral Bay; John E. Rule, Mooney Mooney, both of (AU)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/265,506

(22) Filed: Mar. 8, 1999

(51) Int. Cl.$^7$ ........................................................ B01F 3/04

(52) U.S. Cl. ................... 261/111; 261/DIG. 11; 52/483.1

(58) Field of Search ................. 261/111, DIG. 11, 261/24, 28.3; 52/483.1; 256/19, 24, 25; 220/560.03, 592.28, 669, 678, 692, 917

(56) References Cited

U.S. PATENT DOCUMENTS

| | | | |
|---|---|---|---|
| 4,416,836 | 11/1983 | Sinek | 261/112 |
| 4,422,983 | 12/1983 | Bardo et al. | 261/24 |
| 4,543,218 | 9/1985 | Bardo et al. | 261/24 |
| 4,637,903 | 1/1987 | Bardo et al. | 261/24 |
| 4,769,186 | * 9/1988 | Raybon | 261/DIG. 11 |
| 4,913,710 | 4/1990 | Reverdy | 55/257.1 |
| 4,964,618 | * 10/1990 | Kennedy et al. | 52/483.1 |
| 4,976,895 | 12/1990 | Bardo | 261/108 |
| 5,028,357 | 7/1991 | Bardo | 261/111 |
| 5,054,197 | 10/1991 | Kato et al. | 29/897.31 |
| 5,155,961 | 10/1992 | Bardo | 52/646 |
| 5,236,625 | 8/1993 | Bardo et al. | 261/24 |
| 5,357,729 | 10/1994 | Schütze | 52/653.2 |
| 5,577,353 | 11/1996 | Simpson | 52/92.2 |
| 5,585,047 | 12/1996 | Mortensen et al. | 261/109 |
| 5,811,035 | * 9/1998 | Mockry | 261/111 |
| 5,851,446 | 12/1998 | Bardo et al. | 261/111 |
| 5,902,522 | 5/1999 | Seawell et al. | 261/111 |

OTHER PUBLICATIONS

Ceramic Cooling Tower Co., Permalite® 600 Fiberglass Structure Brochure (1989).
Ceramic Cooling Tower Co., Permalite® 200 Fiberglass Structure Brochure (1989).
Ceramic Cooling Tower Co., Ultralite® 100 Cooling Towers Brochure (1992).
Ceramic cooling Tower Co., Ultralite® 600 XL & 1000 XL Modular Cooling Towers Brochure (1994).

(List continued on next page.)

Primary Examiner—C. Scott Bushey
(74) Attorney, Agent, or Firm—Edward J. Brosius; Stephen J. Manich

(57) ABSTRACT

A heat exchanger is disclosed. The heat exchanger has structural members made of fiber reinforced resin material. These structural members include vertical columns and walls. The walls are bonded to the columns to create rigid joints. The bonded joints have large surface areas. The walls are defined by individual panels that may be bonded together along abutting horizontal box beam sections. The panels have additional box beam sections to strengthen the panels, and connecting webs extending between the box beam sections. Both the box beam sections and connecting webs are bonded to the columns. Mechanical fasteners are used to hold the walls and columns together until the bonding material cures. The heat exchanger is an evaporative heat exchanger with a basin with a sloping floor having a low point. The sloping floor may be made of panels bonded together. The panels are similar in structure to the wall panels, although the box beams may be of different sizes. All of the panels and columns are made by pultrusion. The evaporative heat exchanger also includes an evaporative liquid distribution system, a heat exchange media, and a fan. The evaporative liquid system includes a stainless steel feed box which is connected to a group of spray branches. The spray branches are supported by stainless steel supports that also support drift eliminators. The heat exchange media is supported by stainless steel supports.

21 Claims, 7 Drawing Sheets

OTHER PUBLICATIONS

Baltimore Aircoil Company, Industrial Modular Cooling Towers Brochure (1993).

Ceramic Cooling Tower Co., Unilite® L–Series Cooling Towers Brochure (1994).

BAC–Pritchard, Inc., Series 4008 Wood Cooling Towers Brochure (1989).

BAC–Pritchard, Inc., Series 7000 Field Erected Counterflow Cooling Towers Brochure (1980).

BAC–Pritchard, Inc., Series 4000 Wood Structure Crossflow Cooling Towers Brochure (1982).

Ceramic Cooling Tower Company., Unilite® Pultruded Composite Structure Cooling Towers Brochure (1994).*

Ceramic Cooling Tower Company, Customer Concrete Towers, Permalite® Fiberglass Towers, Ulralite® Fiberglass Towers, Unilite™ Fiberglass Towers Brochure (1980).*

Sheet of Drawings entitled "Wood Cooling Tower".*

* cited by examiner

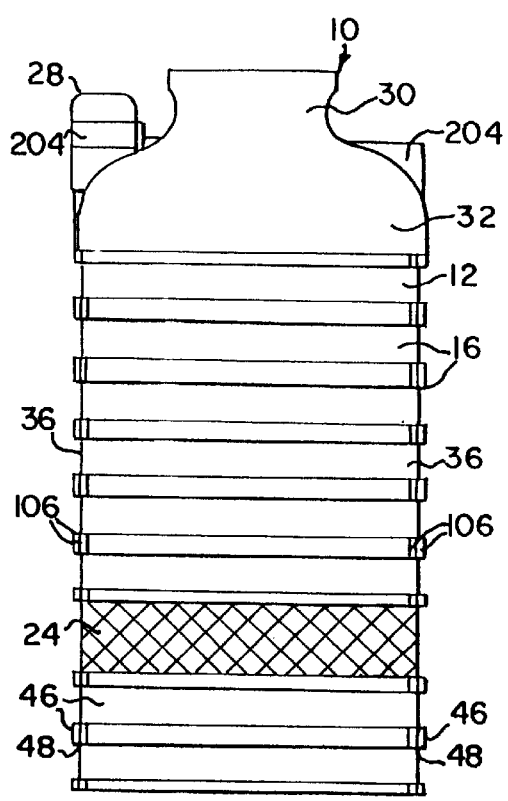
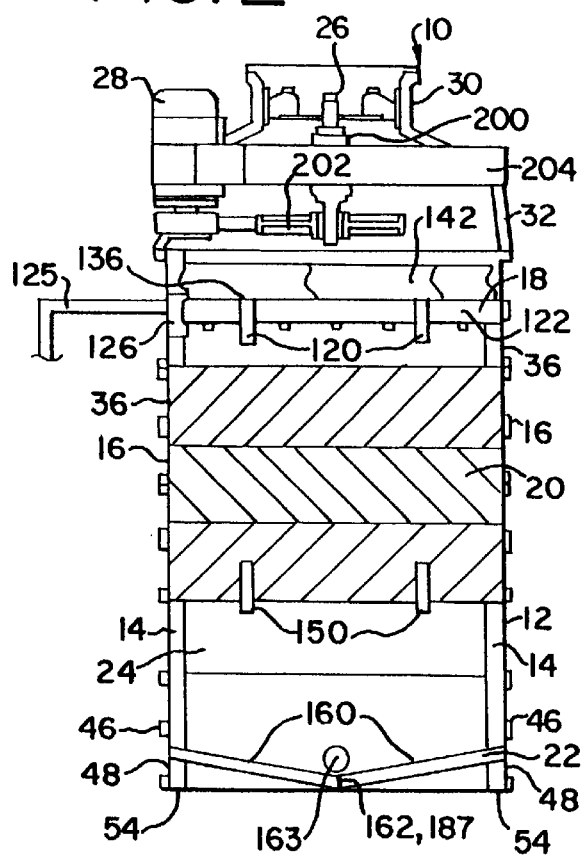
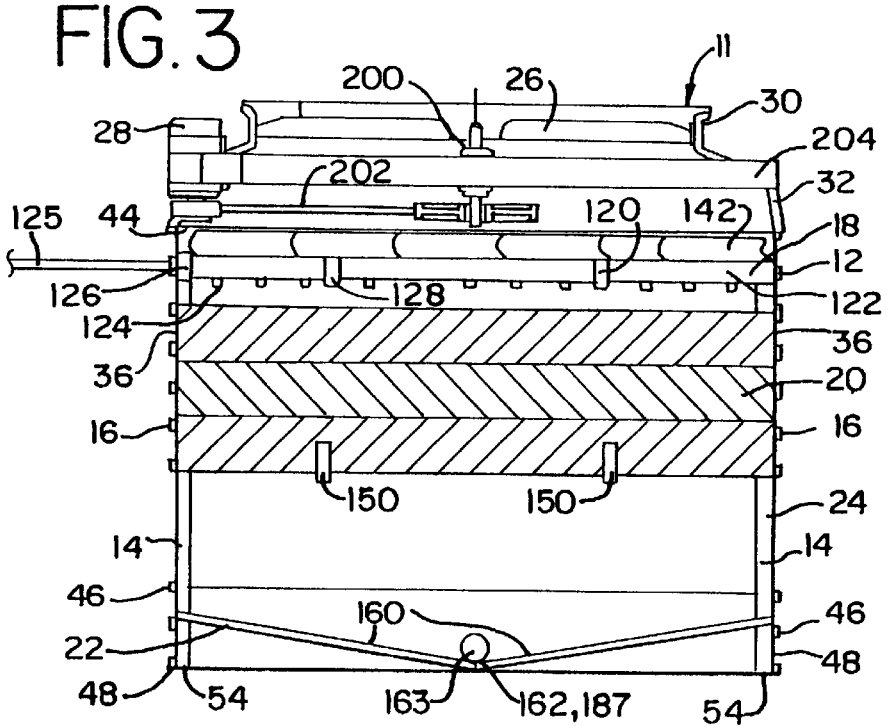

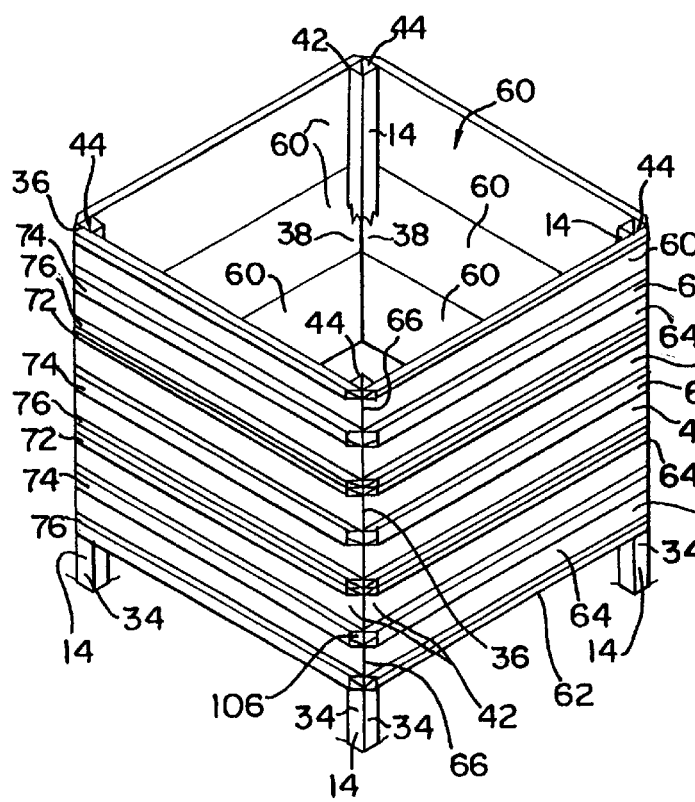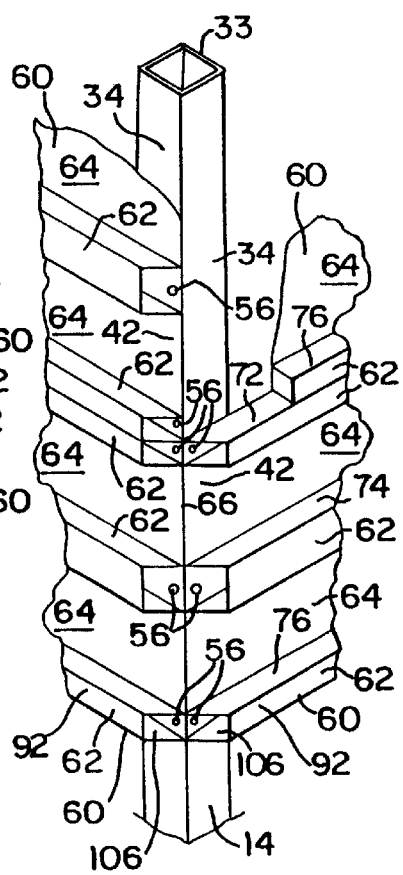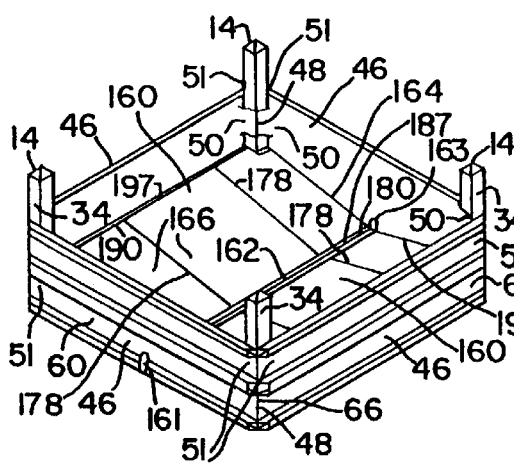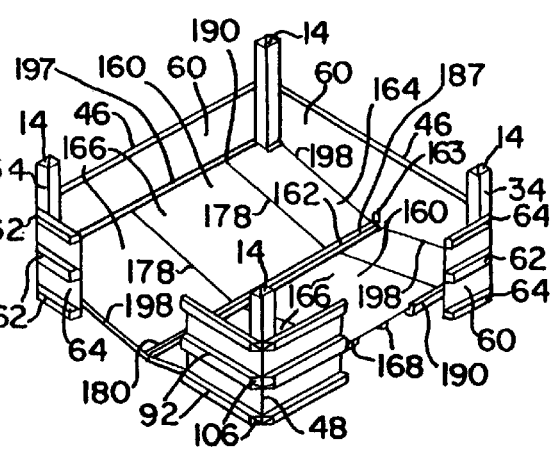

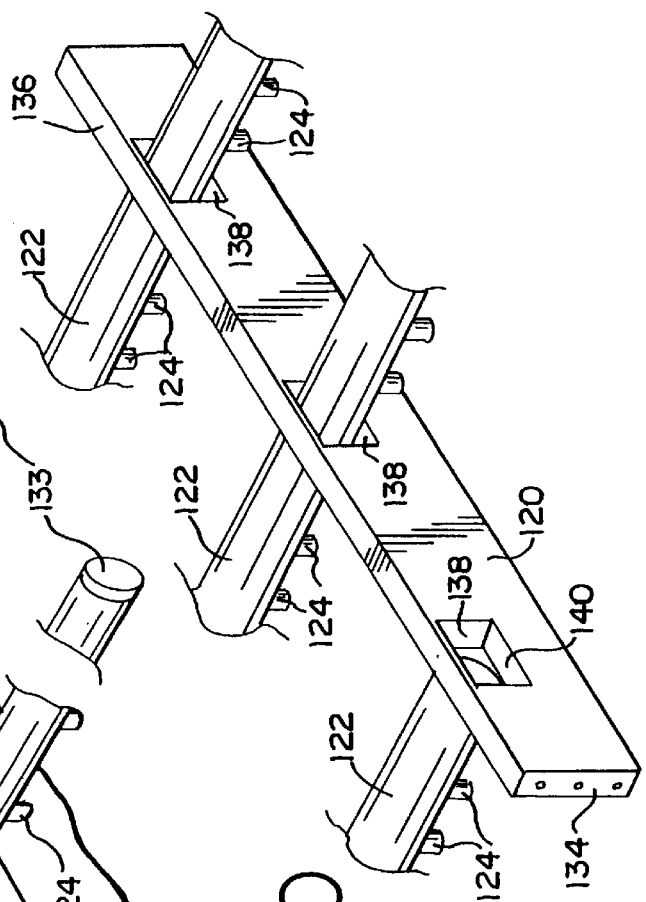
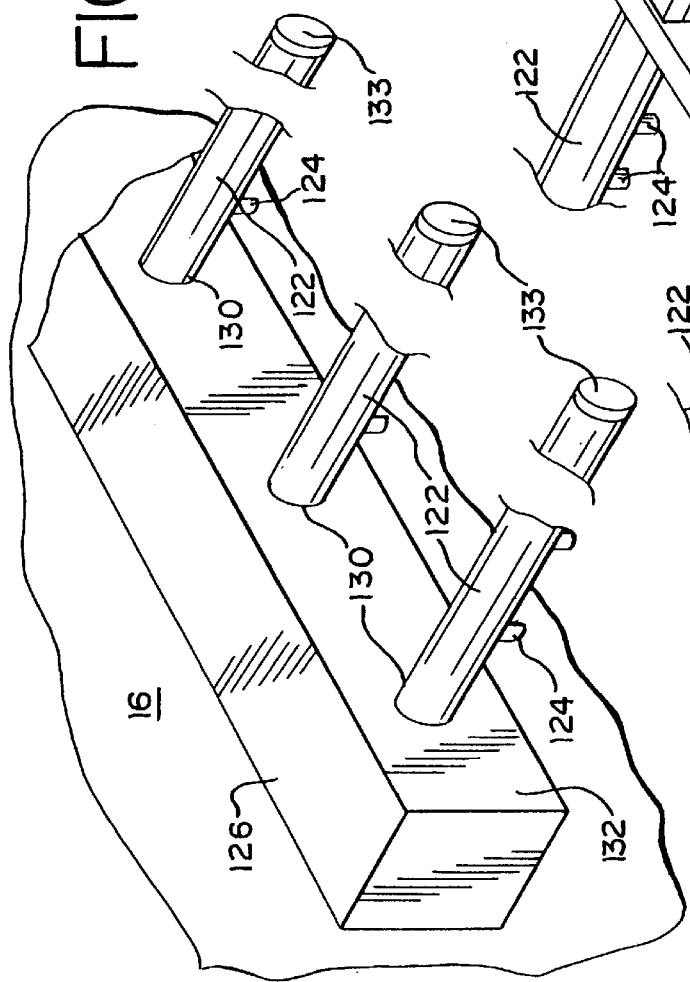
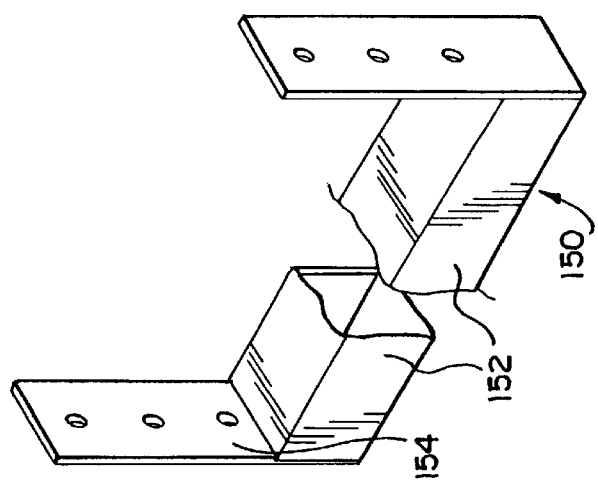

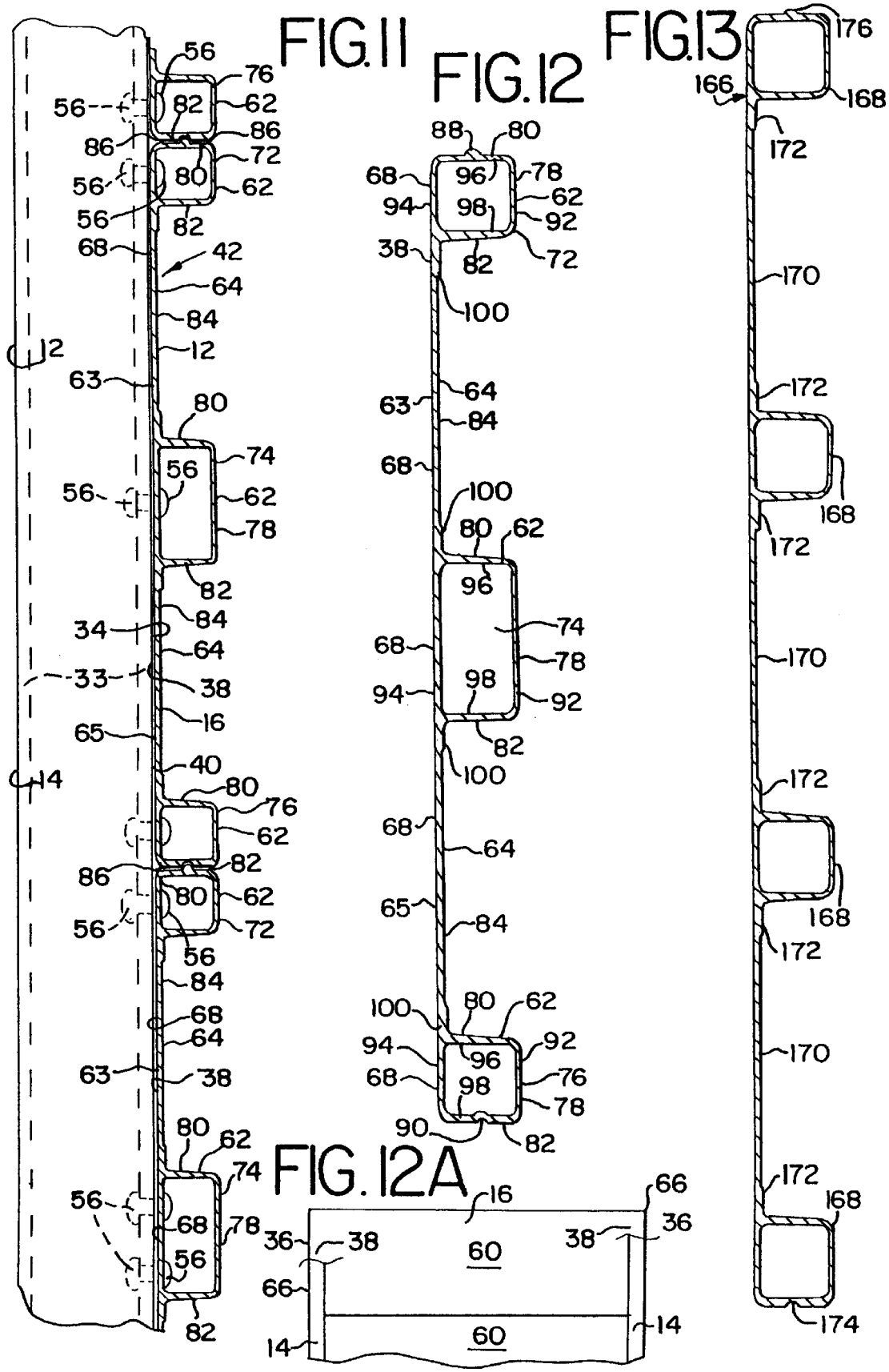

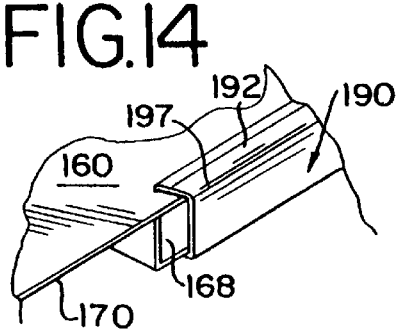
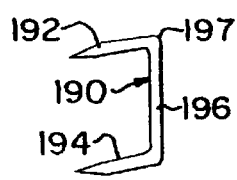
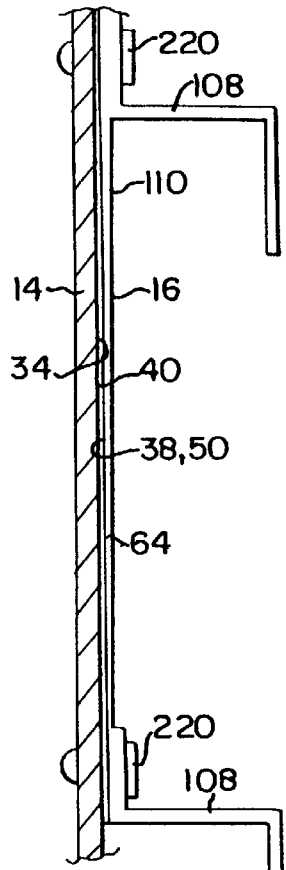
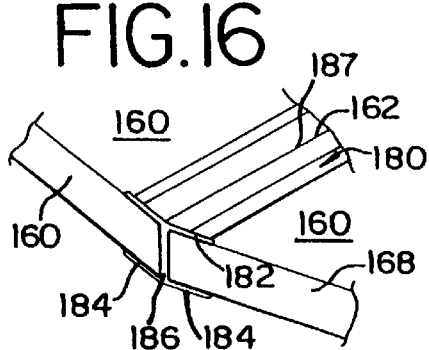
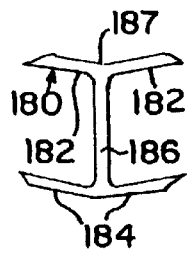
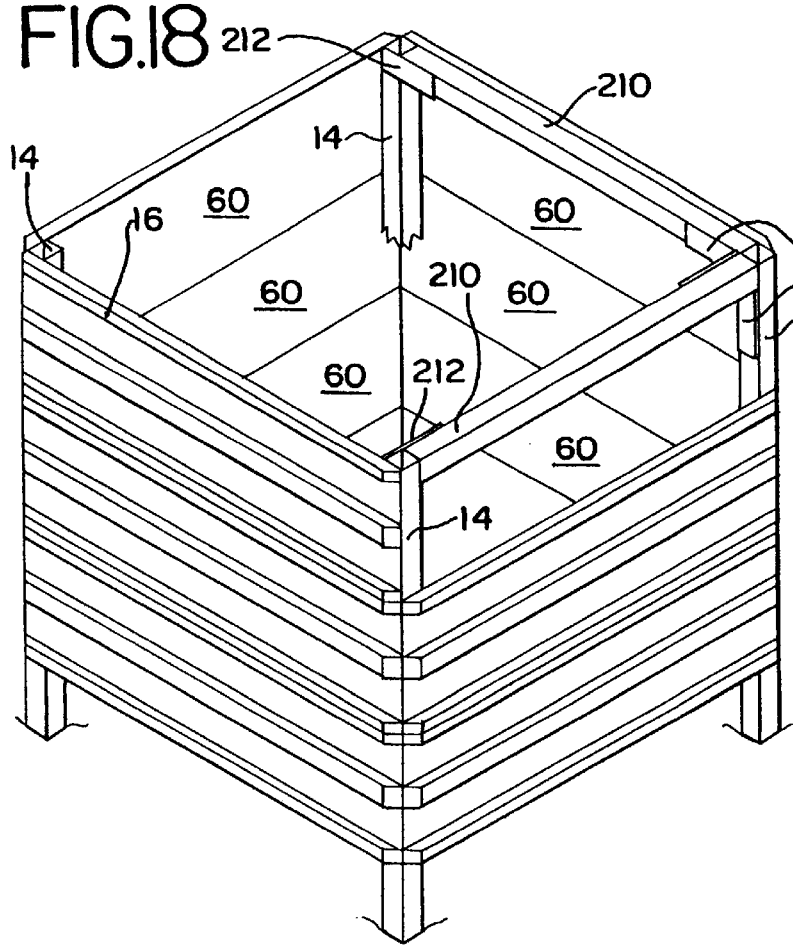
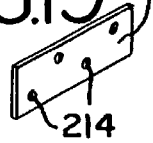
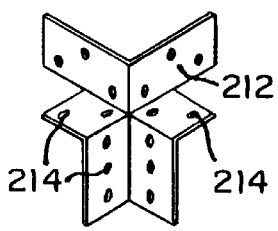

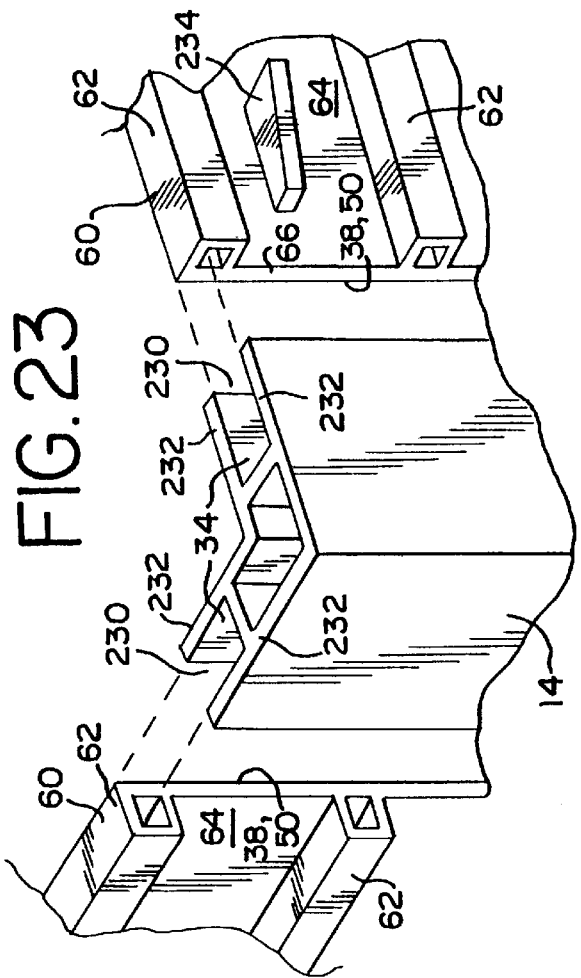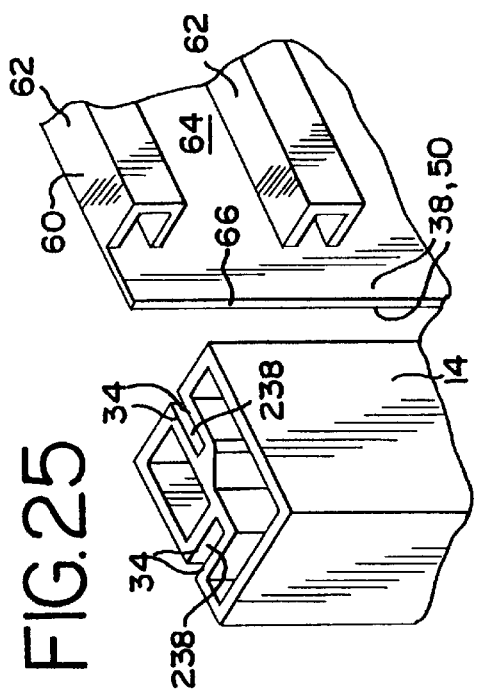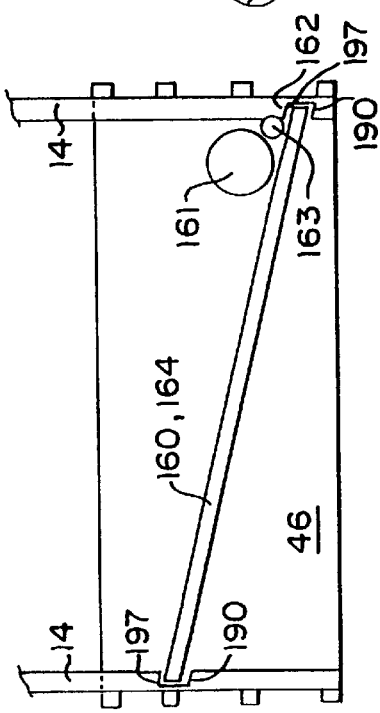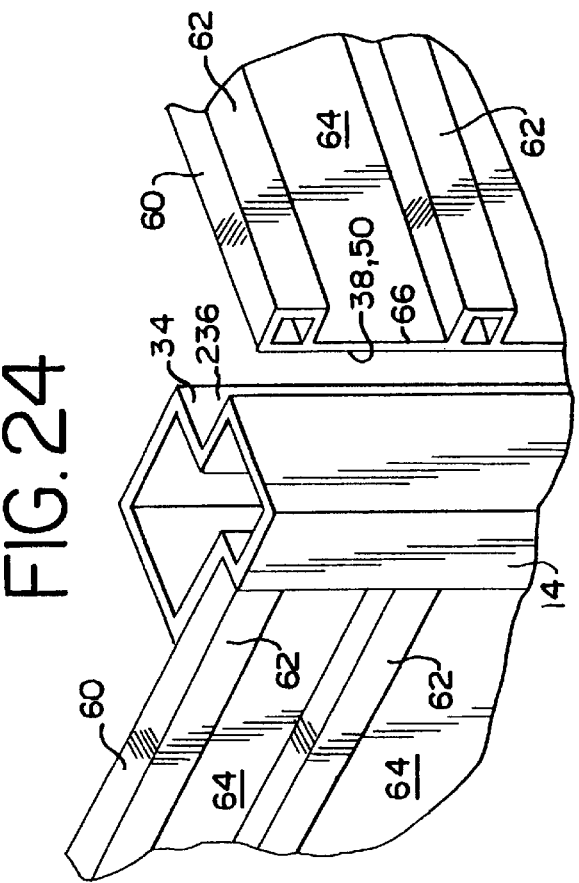

RIGID EVAPORATIVE HEAT EXCHANGERS

BACKGROUND OF THE INVENTION

1. Field of the Invention.

The present invention relates to heat exchangers, and more particularly to heat exchanger support structures made substantially of fiber reinforced resin structural components.

2. Description of the Prior Art.

Prior heat exchangers have included cooling towers and evaporative condensers, for example. Cooling towers are used to cool liquid by contact with air. Many cooling towers are of the counterflow type, in which a warm liquid is allowed to flow downwardly through the tower while a counter current of air is drawn or pushed upwardly through the falling liquid to cool the liquid. Other cooling towers are of the cross-flow type, in which a cross-current of air is drawn or pushed across the falling liquid to cool the liquid. A common application for liquid cooling towers is for cooling water to dissipate waste heat in electrical generating and process plants and industrial and institutional air-conditioning systems.

Most cooling towers include a structural assembly to support dead and live loads, including air moving equipment such as a fan, motor, gearbox, drive shaft or coupling, liquid distribution equipment such as distribution headers and spray nozzles and heat transfer surface media such as fill media. The fill media generally has spaces through which the liquid flows downwardly and the air flows upwardly to provide heat and mass transfer between the liquid and the air. Structural parts of a cooling tower must not only support the weight of the fill material but must also resist wind forces or loads and should be designed to withstand earthquake loads.

Due to the corrosive nature of the great volumes of air and water drawn through such cooling towers, it has been the past practice to either assemble such cooling tower support structures of stainless steel or galvanized and coated metal, or for larger field assembled towers, to construct such cooling tower frames of wood, which is chemically treated under pressure, or concrete at least for the structural parts of the tower.

To withstand expected lateral wind and seismic loads, cooling tower support structures have generally been of two types: shear wall frame structures and laterally-braced frame structures. Shear wall frame structures are generally of fiber reinforced resin or concrete construction, and have a network of interconnected columns and beams, together with shear walls that provide lateral resistance to wind and earthquake loads. In concrete shear wall cooling towers, the joint connections between the columns and beams can be rigid if cast-in-place construction techniques are used. In concrete precast construction and in shear wall towers made of fiber reinforced resin columns and beams, the joints between the columns and beams are designed to allow for rotation between the columns and beams. In laterally braced framing structures, the cooling towers are generally made of wood or fiber reinforced resin beams and columns, framed conventionally for dead load support; and with diagonal braces to resist lateral loads, the frame being covered by a cladding material. The joints where the beams and columns meet are designed to allow for rotation between the structural elements. The joints do not provide lateral resistance to loading or racking of the structure.

Support structures made of concrete are very durable, but concrete cooling tower support structures are expensive and heavy. Many cooling towers are installed on the roofs of buildings, and the weight of a concrete cooling tower can present building design problems. In towers with metal support structures, corrosion of critical structural elements can be problematic in the wet environment. In towers with wood support structures, the wood may decay under the constant exposure to the wet environment. Wood that has been chemically treated to increase its useful life may have environmental disadvantages: the chemical treatment may leach from the wood into the water being cooled. Fiber reinforced resin material has been used successfully as a design alternative to concrete, metal and wood.

Prior art cooling towers using fiber reinforced resin structural elements include those shown in U.S. Pat. No. 5,236,625 to Bardo et al. (1993) and U.S. Pat. No. 5,028,357 (1991) to Bardo. Both patents disclose structures suitable for cooling towers. Another cooling tower using fiber reinforced resin structural components is disclosed in U.S. Pat. No. 5,851,446 to Bardo et al. (1998). In this cooling tower, fiber reinforced resin beams and columns are used along with mounting members. The columns and beams are bonded to the mounting members, and mechanical fasteners are also used to connect the mounting members to the columns and beams. The bonded joints do not allow for rotation between the columns and beams. After the frame of fiber reinforced resin columns and beams is built, a skin or cladding layer is attached in a separate step; the cladding is not intended to add significantly to the structural strength of the frame. Although in all of U.S. Pat. No. 5,236,625, U.S. Pat. No. 5,028,357 and U.S. Pat. No. 5,851,446, the cooling towers provide strong and efficiently-built structures, it is desirable to further reduce costs, particularly for smaller sized cooling towers.

In all of the cooling towers disclosed in U.S. Pat. No. 5,236,625, U.S. Pat. No. 5,028,357 and U.S. Pat. No. 5,851,446, the basins for collecting the cooled fluid that has passed through the fill material have generally flat surfaces, and the bottoms of the columns of the cooling towers are generally fixed to the flat surface of the basin. Typical basins for these cooling towers have been made of concrete or of flat thin pieces of fiber reinforced resin material supported by a steel grill structure. In some countries, such as in Australia and England, the basin structures are required by law to have sloping rather than flat surfaces. In U.S. Pat. No. 4,442,983, a cooling tower is disclosed with a basin made of fiber reinforced resin with sloping floors leading to a trough for collecting the cooled liquid. The entire basin is molded in a traditional manner. Such traditional molding can be expensive, and shipping of such a bulky structure further adds to the expense.

Other heat exchangers, such as evaporative condensers, have used similar support structures. However, instead of fill material within the structure, the condensers use coils of tubes within which a process fluid is condensed. Some condensers utilize evaporative heat exchange, with an evaporative liquid distributed over the condenser coils and collected in a basin below. Problems with the support structures and basin structures generally parallel those described above for cooling towers.

SUMMARY OF THE INVENTION

The present invention provides a heat exchanger with structural components made of fiber reinforced resin materials. These structural components include vertical columns and walls that are bonded together through large surface area joints that give rigidity to the structure. The heat exchanger may be an evaporative heat exchanger with a basin for collecting the evaporative liquid. The basin has sloping floors made of pultruded panels. The heat exchanger of the present invention is particularly efficient and cost-effective for applications requiring smaller-sized cooling towers and for applications where a sloping basin floor is desirable.

BRIEF DESCRIPTION OF THE DRAWINGS

The invention will be described in conjunction with the attached drawings, in which like reference numerals have been used for like parts and in which:

FIG. 1 is an elevation of a rigid evaporative heat exchanger made according to the principles of the present invention;

FIG. 2 is an elevation of the rigid evaporative heat exchanger of FIG. 1, with the upper and lower wall on one side removed and with part of the fan shroud and roof deck removed to show the interior of the cooling tower;

FIG. 3 is an elevation of another, larger rigid evaporative heat exchanger made embodying the principles of the present invention, with the upper and lower wall on one side removed and part of the fan shroud and roof deck removed to show the interior of the heat exchanger;

FIG. 4 is a perspective view of the heat exchanger of FIG. 1 with parts removed to illustrate the structure of the columns and upper walls of the heat exchanger;

FIG. 5 is an enlarged perspective view of one corner of the heat exchanger of FIGS. 1 and 4, with parts removed, illustrating the joints between two walls and one column;

FIG. 6 is a perspective view of the lower walls and basin and parts of the columns of the heat exchanger of FIG. 1;

FIG. 7 is a perspective view of the lower walls and basin and parts of the columns of the heat exchanger of FIGS. 1 and 6, with parts of the lower walls removed to illustrate the structure of the basin;

FIG. 8 is a perspective view of a fill support for use in the heat exchanger of FIGS. 1–3;

FIG. 9 is a perspective view of a feed box and spray branches for use as part of an evaporative liquid distribution system for use in the evaporative heat exchanger of FIGS. 1–3;

FIG. 10 is a partial perspective view of a support structure for use in supporting the spray branches of the evaporative liquid distribution system for use in the evaporative heat exchangers of FIGS. 1–3;

FIG. 11 is an elevation showing a joint between one wall and one column for the heat exchangers of FIGS. 1–3, with the wall panel shown in section;

FIG. 12 is a sectional view of a wall panel for the walls of the heat exchangers of FIGS. 1–3;

FIG. 12A is an elevation, with parts removed, showing the interior side of one wall and two columns of the heat exchangers of FIGS. 1–3 to illustrate the locations of the mounting surfaces of the wall panels;

FIG. 13 is a sectional view of a floor panel for the basin of the evaporative heat exchangers of FIGS. 1–3;

FIG. 14 is a partial perspective view of an edge piece and floor panel of a basin for the cooling towers of FIGS. 1–3, with parts removed;

FIG. 15 is an end view of the edge piece of FIG. 14;

FIG. 16 is a partial perspective view of a keel piece and two floor sections of a basin for the cooling towers of FIGS. 1–3, with parts removed;

FIG. 17 is an end view of the keel piece of FIG. 16;

FIG. 18 is a partial perspective view of the upper walls and columns of an alternate rigid heat exchanger, with parts removed, showing the columns and wall panels with supplementary beams;

FIG. 19 is a perspective view of mounting member for use with the supplementary beams of the rigid heat exchanger of FIG. 18;

FIG. 20 is a perspective view of an alternative mounting member for use with the supplementary beam of the rigid heat exchanger of FIG. 18;

FIG. 21 is an end view of an alternate wall panel for a rigid heat exchanger;

FIG. 22 is an elevation of a lower portion of an evaporative heat exchanger, with one lower wall removed, illustrating an alternate basin design;

FIG. 23 is a perspective view of part of a portion of an alternate column design for a heat exchanger, with portions of two wall panels prior to placement on the column;

FIG. 24 is a partial perspective view of part of an alternate column design for a heat exchanger, with one wall panel in place on the column and the other wall panel shown prior to placement on the column;

FIG. 25 is a perspective view of part of an alternate column design and part of an alternate wall panel design for a heat exchanger;

DETAILED DESCRIPTION

Figure 26:
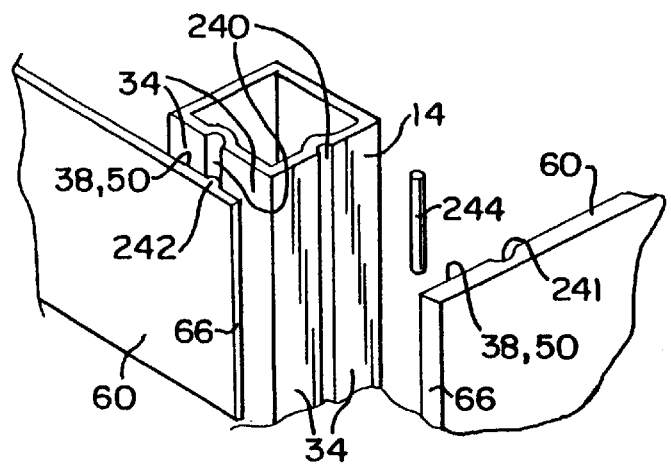
FIG. 26 is a perspective view of part of an alternate column design and parts of two alternate wall designs for a heat exchanger.

A first rigid evaporative heat exchanger 10 incorporating the features of the present invention is illustrated in FIGS. 1–2. A rigid evaporative heat exchanger 11 incorporating the features of the present invention is illustrated in FIG. 3, where like reference numbers have been used for like parts.

Although the invention is illustrated and described below with reference to cooling towers, it should be understood that the principles of the present invention apply as well to other types of heat exchangers. For example, a condenser could be made using the principles of the present invention. As used in the claims, the expression "heat exchanger" should be understood to include cooling towers, condensers, and any other similar structure. It should also be understood that the principles of the present invention may also be applied to creating other rigid structures.

As shown in FIG. 2, the heat exchanger or cooling tower 10 includes a plurality of structural members 12. The structural members are made of a fiber reinforced resin material, and include columns 14 and walls 16. The columns 14 are vertical, spaced apart, and in the first illustrated embodiment, four columns 14 are positioned to define a substantially rectangular footprint. Each wall 16 extends between a pair of adjacent vertical columns 14. In the illustrated embodiment, there are four walls 16 around the periphery of the columns 14. It should be understood that the illustrated shape of the cooling tower is provided for illustration only; the cooling tower could have additional columns and walls to form some other shape, such as, for example, an octagonal footprint.

The heat exchanger or cooling tower 10 also includes an evaporative liquid distribution system 18 for distributing evaporative liquid within the cooling tower, a heat exchange media 20 within the tower and positioned to receive evaporative liquid from the evaporative liquid distribution system 18, and a basin 22 to receive evaporative liquid from the heat exchange media 20. The illustrated cooling tower also includes an air intake opening 24, a fan 26 and a motor 28 for driving the fan. The fan 26 is enclosed within a fan shroud 30 that is part of an overall roof deck 32 for the cooling tower 10.

Each of the vertical columns 14 of the illustrated cooling towers are hollow. In the first embodiment, the columns have lengths of about 210 cm, although other lengths are possible. For example, a larger cooling tower could be built with columns having lengths of about 250 cm, as in the FIG. 3 embodiment. In cross-section, each illustrated column is square and 76 mm by 76 mm (about 3 in. by 3 in.) in outside dimension. The illustrated columns have side walls about 6 mm thick. It should be understood that the dimensions set forth above are provided for purposes of illustration only and that the present invention is not limited to any particular length or width of column or to any particular side wall thickness.

All of the columns 14 in the illustrated embodiment are made of pultruded fiber reinforced resin. The reinforcing fibers may be glass, for example, although it should be understood that reinforcing fibers other than glass may be used and are within the scope of the invention. The reinforcing fibers preferably include long strands extending the length of the columns. The columns may also include various woven fiber materials, for example. A combination of reinforcing fibers is preferably arranged as a laminate that produces the desired properties for the columns. As used herein, "fiber" and "fiber reinforced resin material" are intended to include resin materials with glass or other fiber, including such fibers in the form of continuous strand, continuous strand mat, woven mat, non-woven mat, and combinations of continuous fiber roving, including strands of spun roving and straight roving, as well as other forms of reinforcing fibers suitable for use in pultrusion.

The columns 14 may be produced by conventional pultrusion techniques. Pultrusion is a continuous molding process which utilizes reinforcing fiber in a polyester, vinylester or other thermosetting resin. The reinforcing material is drawn through a resin bath, and the resin-impregnated reinforcing material is pulled through a heated steel die. The reinforcement/resin laminate solidifies in the shape of the cavity of the die as it is pulled by the pultrusion machine. The resin may be any conventional plastic or resin material, such as thermoset polyester resin, for example, and the term "resin" is intended to include all such conventional matrix materials as well as later-developed matrix materials. The columns may be made of fire-resistant materials. Commercially available tubes may be used for the columns. The tubes should have at least two flat outer surfaces with sufficient flat surface areas for bonding to the walls of the tower, as described in more detail below. It should be understood that other structures may be used for the columns; for example, the columns could comprise angles, or could be triangular or octagonal in cross-section. Some alternate column designs are illustrated in FIGS. 23–27.

The materials selected for the columns 14 should have characteristics that meet design criteria for the cooling tower. Generally, when the columns 14 are bonded to the walls 16 as described below, a rigid structure is created, and the columns 14 have a buckling or bending length of zero. When bonded to the columns 14, the walls 16 stiffen the columns 14; the walls 16 and bonded joints provide rigidity to the columns 14, and the columns 14 do not bend or buckle. The rigid structure may be characterized as a plate or sheet braced structure.

In the illustrated embodiments the columns are spaced apart in a square footprint. The first cooling tower 10 has an outer dimension of about 150 cm. It should be understood that the cooling tower could be of different size and shape, such as a larger cooling tower with a square footprint and outer dimensions of about 340 cm.

The columns 14 have four faces, and these faces provide four mounting surfaces, designated 34 in the accompanying drawings. In embodiment illustrated in FIGS. 2–7, 11–13 and 18, two adjacent outside faces of each column are used as mounting surfaces for mounting two walls to each column. In these embodiments, the mounting surfaces of each column have widths that extend substantially across one dimension of the column; that is, the width of each mounting surface is about the same as the width of each face of the column. Thus, substantially the entire width of each face of the column provides a mounting surface for the column.

Each wall 16 extends between two columns 14 and includes a pair of spaced parallel edges 36. The edges 36 are substantially vertical, and each wall includes mounting surfaces 38 along the vertical edges. The mounting surface 38 along one edge of the wall and at least a part of the mounting surface 34 of one column lie in a face-to-face relationship with bonding material between the two facing mounting surfaces. The layer of bonding material is shown at 40 in FIGS. 11 and 21. The face-to-face mounting surfaces 34, 38 and bonding material 40 define joints 42: a first joint 42 comprises at least a portion of the mounting surface 34 of one column 14, the mounting surface 38 of one wall 16 and the bonding material 40, with the mounting surfaces 34, 38 lying in a face-to face relationship with the bonding material 40 between them; and a second joint 42 comprises at least a portion of the mounting surface 34 of a second column 14, the opposite mounting surface 38 of the same wall, and the bonding material 40, the two mounting surfaces 34, 38 lying in a face-to-face relationship with the bonding material 40 between them. With four columns and four walls, eight similar joints are formed, all designated 42 in the accompanying drawings. In the illustrated embodiment, the walls 16 and joints 42 extend downward from the tops 44 of the columns 14. Each joint 42 extends along a substantial part of the length of each column. In the illustrated embodiments, each joint extends more than half the length of each column 14: for the smaller cooling tower, each joint 42 extends for 135 cm of the total length of the column of 210 cm; for the larger cooling tower, each joint 42 extends for about 140 cm of the total length of the column of about 250 cm. Each joint 42 also extends along the entire length of both vertical edges 36 of each wall 16, and each mounting surface 38 of each wall 16 covers at least a substantial part of the width of each column mounting surface 34. Preferably, each mounting surface 38 of each wall covers the entire width of each column mounting surface 34. Thus, for a column having a width of 76 mm (about 3 in.), the area of each joint in the illustrated embodiments is 106,400 mm$^2$ (1064 cm$^2$). This is also the area of each mounting surface on each wall 16, and the area of the column mounting surface 34 that is used for these joints.

The above discussed walls 16 are disposed above the air-intake openings 24 in the cooling towers, and form the upper walls of the illustrated cooling towers. The illustrated cooling towers also include four lower walls 46 spaced below the four upper walls 16. Each lower wall 46 extends between two columns 14 and includes a pair of spaced parallel edges 48. The edges 48 are substantially vertical, and each lower wall 46 includes mounting surfaces 50 along the vertical edges 48. The mounting surface 50 along each edge 48 of each lower wall 46 and at least a part of the mounting surface 34 of each column 14 lie in a face-to-face relationship with bonding material between the two facing mounting surfaces, in the same manner as for the upper wall as illustrated in FIG. 11, where the bonding material is designated 40. The mating mounting surfaces 50, 34 of the lower walls and columns 14 define eight similar lower joints 51. In the illustrated embodiments, the lower walls and lower joints 51 extend upward from the bottoms 52 of the columns 14. In the illustrated embodiments, each lower joint 51 extends upward a distance of about 460 mm, along the entire vertical edge 48 of each lower wall 46. Thus for a column having a width of 76 mm, the area of each lower joint 51 in the illustrated embodiments is about 35,000 mm$^2$ (350 cm$^2$). This area also corresponds with the area of each lower wall mounting surface 50 and the portion of each column mounting surface 34 in the lower joints.

Considering both the upper and lower joints for each column, substantial parts of the entire lengths of two mounting surfaces 34 of each column are bonded to form a joint. The only parts of these mounting surfaces that are not part of a joint are those parts at the air intake openings 24.

The bonding material 40 covers substantially the entire area of each upper joint 42 and lower joint 51. The bonding material should be one that is waterproof when cured and that will bond to the mounting surfaces 34 of the columns 14 and mounting surfaces 38, 50 of the upper and lower walls 16, 46. The bonding material may comprise, for example, an epoxy material such as "Magnobond 56-K-A&B" or "Magnobond 62A&B" available from Magnolia Plastics of Chamblee, Georgia. Magnobond 56 is a high strength epoxy resin and modified polyamide curing agent adhesive designed for bonding fiber reinforced resin panels to a wide variety of substrates. Alternatively, a methacrylate adhesive could be used, such as structural and automotive methacrylates. It is expected that other construction adhesives will work in the present invention. For example, it may be desirable to use an adhesive that is provided in sheet form. All of these and similar products are intended to be included within the expression "bonding material" and term "adhesive". The adhesives and bonding materials are identified for purposes of illustration only; other adhesives or bonding materials may be used and are within the scope of the invention.

Generally, a generous application of bonding material may be desirable to ensure that an effective amount is present. Surface preparation of the mounting surfaces of the columns and walls is desirable: both surfaces may first be scuffed with a mechanical sander, then wiped clean with a cleaning solvent, such as such as Methyl Ethyl Ketone, (also known as "MEK" and Ethyl Methyl Ketone). The uncured bonding material may then be applied to one or both of the mounting surfaces for each joint and then spread out with a flat spatula or scraper; preferably, the uncured bonding material is applied to only one of the mating mounting surfaces of each joint, such as mounting surfaces 38 of upper walls 16 for the upper joints and mounting surfaces 50 of the lower walls 46 for the lower joints 51. The mating mounting surfaces 34, 38 and 34, 50 may then be pressed together. The full mating areas of the mating mounting surfaces 34, 38 and 34, 50 should be covered with bonding material when pressed together.

The mating mounting surfaces 34,38 and 34,50 of the columns 14 and walls 16, 46 must be kept in contact with the bonding material 40 at a close spacing until the bonding material cures. In the embodiments illustrated in FIGS. 2–7 and 18, mechanical fasteners 56 extend through the mating mounting surfaces 34, 38 and 34, 50 of the walls 16, 46 and columns 14 to hold the mating mounting surfaces 34, 38 and 34, 50 at the desired surface contact with the bonding material. A preferred mechanical fastener 56 is a compression fastener. Examples of suitable compression fasteners are "AVDEL Monobolt" ¼ inch diameter compression fasteners and "AVDEL Avinos" 3⁄16 inch diameter compression fasteners, both made of 304 stainless steel, and both available from Textronn Fasteners of Rydalmere, New South Wales, Australia. Such a compression fastener is illustrated in FIG. 11. Such compression fasteners operate similar to pop or blind rivets, except that they do not expand within the hole, but only on one side of the hole. It should be understood that compression fasteners are identified for purposes of illustration only; screws, nuts and bolts, and rivets could also be used, for example. In addition, it should be understood that the particular brands of compression fastener are identified for purposes of illustration only; other brands and types of compression fasteners could be used as well.

The mechanical fasteners 56 serve to support the construction load and design dead load on the cooling tower until the bonding material 40 has cured, and become part of each joint after the bonding material 40 has cured. Thus, the cooling tower can be built without the structural benefit of the cured bonding material. The mechanical fasteners 56 also serve to provide a clamping effect between the mating mounting surfaces 34, 38 and 34, 50 to ensure even thickness and coverage of bonding material.

The columns and walls may have pre-drilled location holes for the mechanical fasteners 56. The use of location holes correctly positions the mating column and wall structural components and achieves proper edge spacing between the walls on the columns.

After the bonding material has cured, the joints 42, 51 between the walls 16, 46 and the columns 14 are rigid. As used herein, the expression "rigid joint" refers to a joint that joins the components so that the joined components react to design dead and live loads as a single component. Generally, after the bonding material has cured, the two mating mounting surfaces 34, 38 and 34, 50 of the column and walls, along with the cured bonding material 40, will deform in an identical manner at stresses at least up to design loads. Tests described in greater detail below illustrate that failure under loads have generally been through failure of one of the components through delamination and buckling, particularly the wall itself, rather than through failure of the joint, confirming that the joints are rigid. For these tests, the load-carrying stress of the joint was in excess of anticipated loads for a cooling tower application.

The quantity, spacing and location of the mechanical fasteners 56 may vary with the joint and the anticipated stresses on the joint. Generally, since the mechanical fasteners assure that the two mating mounting surfaces are at an optimal spacing and properly contacting the bonding material without gaps, additional mechanical fasteners may be used at critical joints. In addition, where it is desired to ensure that a water-tight seal is created, it may be desirable to use additional mechanical fasteners.

Each wall 16, 46 of the illustrated cooling tower includes at least one panel 60 comprising strengthening sections 62 and integral connecting sections 64 extending between the strengthening sections 62. In the embodiments illustrated in FIGS. 1–2, there are three panels 60 forming each upper wall 16 and a single panel 60 forming each lower wall 46. Each panel 60 has a pair of spaced vertical edges 66 that define the vertical edges 36, 48 of the upper and lower walls 16, 46. Each panel 60 is of the same structure, and the following description of one panel 60 should be understood to apply to all of the wall panels. It should also be understood that although the wall panels 60 are all identical in the FIGS. 1–2 embodiments, it is not necessary that the panels be identical. However, use of identical wall panels adds to the efficiency of production. It should also be understood that fewer or more panels can be combined into a wall.

In the first two illustrated embodiments, each wall panel 60 has three strengthening sections 62 and two connecting sections 64, although it should be understood that each panel could have fewer or additional strengthening or connecting sections. As illustrated, each strengthening section 62 and each connecting section 64 extends horizontally across the panel, substantially from one vertical edge 66 to the other vertical edge 66 of the wall panel. The mounting surfaces 38, 50 of each wall 16, 46 extend along the two edges 66 of the panel, across both the strengthening sections and connecting sections, and are integral with the strengthening sections 62 and connecting sections 64. The mounting surfaces 38, 50 extend along the entire vertical dimension of each edge of the panel, and lie in substantially the same plane. As discussed above, each mounting surface 38 or 50 of each panel is disposed in a face to face relationship with a portion of the mounting surface 34 of one column, and bonding material 40 is disposed between the mounting surfaces of the columns and panels to bond the columns and panels together. As shown in FIGS. 11–12, the strengthening sections 62 and connecting sections 64 may have inner surfaces 68 that are co-planar with the mounting surfaces of the panel.

As shown in FIGS. 11–12, the strengthening sections 62 of the panels 60 may comprise box beams. In the embodiment of FIGS. 2–7 and 11–12, there are three box beams per panel 60, an upper box beam 72, a middle box beam 74 and a lower box beam 76. Each box beam is hollow, and has an inner substantially vertical surface 68, an outer substantially vertical surface 78, an upper non-vertical surface 80 and a lower non-vertical surface 82. The non-vertical surfaces 80, 82 may be substantially horizontal, as illustrated. The inner vertical surfaces 68 of the box beams define the mounting surfaces 38, 50 for the box beam sections of the wall panels 60. The connecting sections 64 include an upper connecting web 63 that extends between the middle box beam 74 and the upper box beam 72 and a lower connecting web 65 extending between the middle box beam 74 and lower box beam 76. Each of the upper and lower connecting webs 63, 65 comprises a solid web of material between substantially parallel inner and outer faces; each inner face is substantially co-planar with the vertical inner surfaces of the box beams, and is designated with the same reference number 68 in the drawings; each outer face of each connecting web is substantially vertical and is designated 84 in the drawings. The inner faces 68 of the connecting webs 63, 65 define the mounting surfaces of the connecting webs 63, 65 of the panel. The solid connecting webs and box beams are integral so that the mounting surfaces 38, 50 for the box beams extend above and below the upper and lower non-vertical surfaces 80, 82 of the middle box beam 74, above the upper non-vertical surface 80 of the lower box beam 76, and below the lower non-vertical surface 82 of the upper box beam 72. Thus, each panel could alternatively comprise a single box beam with mounting surfaces that extend beyond the upper and lower surfaces 80, 82 of the beam so that the contact area for the joint between the beam and column would exceed the area of the end of the box beam alone.

In the upper walls 16 of the embodiments illustrated in FIGS. 2–5, the three panels comprising each upper wall are bonded together by abutting adjacent box beams together. As shown in FIGS. 11–12, the middle box beam 74 is substantially rectangular in cross-section, and the upper and lower box beams 72, 76 are smaller and substantially square in cross-section. As shown in FIGS. 4 and 11, the lower box beam 76 of the top panel abuts and is bonded to the upper box beam 72 of the middle panel, and the lower box beam 76 of the middle panel abuts and is bonded to the upper box beam 72 of the lower panel. The bonding is along substantially the entire lengths of the abutting box beams, and across substantially the entire widths of the abutting surfaces 80, 82 of these box beams. The bonding is accomplished through the use of bonding material of the type described above spread over one of the mating surfaces of the box beams. The bonding material is shown generally at 86 in FIG. 11. As shown in FIG. 12, the abutting and bonded nonvertical surfaces 80, 82 of the box beams 72, 76 have complementary protrusions 88 and indentations 90 for proper location of the box beams before the bonding material cures; the complementary abutting surfaces of the adjacent panels define tongue and groove joints. The bonded upper and lower beams 72, 76 of the adjacent and abutting panels define compound beams; that is, the two bonded beams act substantially as a single, larger beam. With the three panels so bonded together and bonded to the columns, there is substantially no relative movement between the panels and columns at design loads.

Before bonding the abutting beams 72, 76 together, the surfaces should be prepared as described above for the bonds between the columns and walls. The non-vertical surfaces 80, 82 should be scuffed with sandpaper or a mechanical sander, cleaned with a solvent, and then the uncured bonding material should be applied and spread across one of the non-vertical surfaces. The adhesive or bonding material may be the same as that used for the joints between the walls and the columns.

The wall panels 60 are preferably made of fiber reinforced resin material by pultruding the entire structure, including the box beams 72, 74, 76 and connecting sections 64 as a unit. Long fibers could be set to run horizontally along the strengthening and connecting sections 62, 64. Woven reinforcements could be concurrently embedded in the connecting webs 63, 65 and box beams 72, 74, 76 during manufacture to make the joints between the box beams 72, 74, 76 and connecting webs 63, 65 extremely strong, lightweight and cost effective. As in the case of the columns, the fibers may comprise glass fibers or some alternative, and the resin material may comprise a polyester thermoset resin, for example. Alternatively, separately formed box beams could be mounted on separately formed panels and bonded with bonding material or through a separate manual lay up process using additional fiber and resin materials, but the strength of the panel may decrease while the weight and cost of manufacture may increase.

An exemplary pultruded wall panel as illustrated in FIG. 12 may have an overall height, excluding the protrusion 88, of about 460 mm, for example. The upper and lower box beams 72, 76 may each have open inner dimensions of about 35 by 35 mm, excluding the indentation 90 in one beam. The middle box beam 74 may have open inner dimensions of 72 by 35 mm. The outer dimension of each box beam from inner vertical surface 68 to outer vertical surface 78 is about 40 mm. The height of each connecting web 63, 65 is about 155 mm, less the thickness of the walls of the box beams 72, 74, 76 above and below the connecting sections. The vertical outer walls 92 of the box beams have thicknesses of about 2 mm, and the inner walls 94 have thicknesses of about 2 mm. The upper wall 96 and lower wall 98 of the middle box beam 74 flare slightly toward the junctions or joints 100 with the connecting webs 63, 65, with the upper and lower surfaces 80, 82 defining angles of about 3° with horizontal in the embodiment illustrated in FIGS. 11–12. Similarly, the upper wall 96 of the lower beam 76 and lower wall 98 of the upper beam 72 flare slightly toward the junctions or joints 100 with the connecting webs 63, 65 so that the lower surface 82 of the upper beam 72 and the upper surface 80 of the lower beam 76 each define an angle of about 3° with horizontal. All of the joints 100 are reinforced with additional fiber during pultrusion, and the reinforced joints 100 extend about 10 mm into the connecting webs 63, 65 at each joint. The connecting webs 63, 65 have thicknesses of 2.75 mm between the joints. The upper wall of the upper box beam 72 with the protrusion 88 is 3 mm thick, and the protrusion 88 itself is 3 mm thick. The lower wall of the lower box beam 76 with the indentation 90 is 3 mm thick, except for at the indentation 90. The upper surface 80 of the upper box beam 72 and the lower surface 82 of the lower box beam 76 are substantially horizontal, except for the indentation and protrusion, so that there are mating surfaces for the bonding material. It should be understood that the above-identified dimensions and angles are provided for purposes of illustration only, and that the invention is not limited to any particular dimension or angle.

As illustrated in FIGS. 1–7, the outer vertical walls 92 at the ends 106 of the box beams 72, 74, 76 at the columns 14 may be beveled to simplify placement of the compression fasteners 56 in constructing the cooling tower. However, the outer vertical walls 92 of the box beams need not be beveled, but could extend the full horizontal dimension of the wall. For such a structure, it may be necessary to use longer mechanical fasteners at the ends of the beams, extending through spacers through the hollow portion of the beam, for example.

An alternative wall panel structure is illustrated in FIG. 21. As there shown, the strengthening sections 62 of the wall panels may comprise L-shaped or Z-shaped angles or ribs 108 extending outward from a flat panel 110. The ribs could be made integral with the flat panel or later bonded to a previously made panel using the same bonding material and bonding procedure described above, with compression fasteners, shown at 220 in FIG. 21.

Each lower wall 46 in the illustrated embodiment comprises a single wall panel on each of the four sides of the structure. In the illustrated embodiment, each panel for each lower wall 46 has strengthening sections 62 and connecting sections 64 like those in the panels for the upper walls 16. It should be understood that the wall panels need not be the same for the upper and lower walls. Moreover, the panel or panels defining one wall can be different from the panel or panels defining another wall.

The cooling towers illustrated in FIGS. 1–3 are counterflow cooling towers, and the upper and lower walls 16, 46 are spaced apart to define the air intake openings 24 between the upper walls 16 and lower walls 46 on all sides of the cooling tower. In the first illustrated embodiment, the air-intake openings are about 30cm high, and may be larger for a larger cooling tower, such as 65 cm, for example for the cooling tower of FIG. 3. It should be understood that these dimensions are provided for purposes of illustration only, and that the invention is not limited to any particular dimension. Moreover, although the embodiments illustrated in FIGS. 1–3 are counterflow cooling towers, the principles of the present invention could be applied to cross-flow designs, for example.

The evaporative liquid distribution system 18 of the illustrated cooling towers includes a plurality of spray branch supports 120, spray branches 122, nozzles 124, a feed box 126 and a supply line. The supply line, shown at 125 in FIGS. 2–3, connects the feed box 126 to the source of evaporative liquid. The feed box 126 extends substantially along the length of one upper wall 16 of the cooling tower. The feed box 126 is preferably made of stainless steel. It may be attached directly to the wall of the cooling tower with bonding material and mechanical fasteners, or may be supported in other more conventional ways, such as by brackets mounted on the wall 16. The feed box 126 has a plurality of bores 130 spaced along the wall 132 facing the interior of the cooling tower.

As shown in FIG. 9, each of the spray branches 122 of the evaporative liquid distribution system 18 connects to the feed box 126 through one of the feed box bores 130. The spray branches 122 extend perpendicularly outward from the feed box 126 toward the opposite upper wall of the cooling tower, where the ends of the spray branches 122 are closed and sealed with end caps 133. Each spray branch 122 has a plurality of spaced, downwardly-directed nozzles 124. The spray branches 122 comprise PVC pressure pipe of either a 3 or 4 inch diameter in the illustrated embodiment, although it should be understood that other materials and sizes of materials may be used.

Each spray branch 122 also extends through two spray branch supports 120. Each spray branch support is of similar construction, and only one will be described; it should be understood that this description applies to all of the spray branch supports. Each spray branch support 120 is preferably made of stainless steel, and has closed ends, one of which is shown at 134 in FIG. 10. As shown in FIG. 10, the spray branch support 120 has a top surface 136 extending across the support and openings 138 spaced along the length of the support. Each opening 138 in the illustrated embodiment comprises a rectangular opening. One spray branch 122 extends through each opening 138 and is supported within the opening. The spray branch support 120 may be made from a length of sheet metal, with the top edge folded over to form the top surface 136 and with three-sided cuts made in the sheet and folded along the edge of the fourth side to define ledges 140 at each opening for supporting the spray branch pipe. The ends may be folded over along vertical edges and have holes for receiving mechanical fasteners for connecting the ends of the support to one wall of the cooling tower. The ends may be bonded to the walls of the cooling tower with the same epoxy used for the joints between the walls and columns, or with some other bonding material. The spray supports could also be supported by mechanical fasteners without bonding material. In the illustrated embodiments, there are two spray supports per tower, with one spray support every 5 feet, and with a 1 foot overhang at one end, the other end of each spray branch being supported by the feed box 126. The number and spacing of the spray supports are provided for purposes of illustration only, and the invention is not limited to the illustrated embodiments.

The top surfaces 136 of the spray supports serve as supports for the drift eliminators for the cooling tower. The drift eliminators are shown at 142 in FIGS. 2 and 3. The drift eliminators 142 may comprise a standard assembly known in the art, such as layers of angled slots to form a zig-zag path, or spaced apart airfoil shaped vanes, to permit air to flow upward through the drift eliminator but to impede the flow of water.

In the illustrated embodiments, hot liquid, such as water, is received from an external heat exchange system, such as an electrical generating plant, process plant or air-conditioning system, and is delivered through the supply pipe, shown at 125 in FIGS. 2–3, to the feed box 126. From the feed box 126 the hot liquid flows to the spray branches 122. The hot liquid flows through the spray branches 122 to the nozzles 124, where the hot liquid is sprayed over the heat exchange media 20. The sprayed liquid then falls onto the heat exchange media 20 below the evaporative liquid distribution system 18 and drips or flows through the heat exchange media 20. The evaporative liquid contacts the counterflow air current in the heat exchange media, and the evaporative liquid is cooled. If the heat exchange material includes a tube bundle, the evaporative liquid also indirectly exchanges heat with the process fluid carried within the tubes.

The heat exchange media 20 of the illustrated cooling tower comprises fill material. The fill material may comprise a lightweight fill, such as fill made of PVC (polyvinyl chloride), for example. In the illustrated embodiment, blocks of multiple generally corrugated vertical sheets of polyvinyl chloride are used as the fill material. Commercially available fill material may be used. Other materials could be used as well. For example, splash boards or other material could be used as the heat exchange media. Open celled clay tile may be used, as well as open cell PVC material. The heat exchange media could also comprise a coil system if the cooling tower is to be used for indirect heat exchange, or if the structure is to be used for a condenser. The above heat exchange materials are identified for purposes of illustration only, and the invention is not limited to any particular type of heat transfer material. Moreover, as discussed above, the invention is not limited to cooling towers, but may be applied to other heat exchangers, such as evaporative condensers, as well.

The fill material in the illustrated embodiment is supported on a pair of fill supports 150. The two fill supports are substantially the same, and only one will be described; it should be understood that the description applies to the other fill support as well. As shown in FIG. 8, each fill support 150 comprises an elongate channel 152 and two vertical straps 154. The channel 152 is long enough so that the fill support can extend across one dimension of the tower, from one upper wall to an opposite upper wall. In the illustrated embodiment, the channel 152 is connected at its ends to the vertical straps 154. The channel and vertical straps are both made of stainless steel and are connected by welding. The channel 152 is oriented with its legs facing downward for drainage and strength, and extends continuously from one strap to the other. The straps 154 comprise flat plates with bores for receiving mechanical fasteners. Each strap is mounted to one wall. The straps are mounted by applying uncured bonding material to one face of the strap, positioning the strap against the inner surface of a wall panel, and inserting mechanical fasteners, preferably compression fasteners, through the strap and wall. The bonding material may be the same epoxy used for creating the joints between the wall panels and the columns. The compression fasteners clamp the wall and straps together while the epoxy cures and provides sufficient structural strength to support the weight of the fill support and fill until the epoxy cures to provide a rigid connection between the fill support and the wall. Generally, the fill supports may be spaced about 5 feet apart, with two foot overhangs for PVC fill material. The number and spacing of fill supports is provided for illustration only, and the invention is not limited to the illustrated fill support system.

From the heat transfer media 20, the cooled evaporative liquid drips down to the basin 22 below the air intake openings 24 of the cooling tower. The cooled evaporative liquid may then flow through an outlet, shown at 161 in FIGS. 6 and 22, and be pumped or otherwise drawn and re-circulated through the evaporative liquid distribution system 18 or through the external heat exchange system.

As shown in FIGS. 2–3 and 6–7, the first illustrated basin has two floor sections 160 sloping toward a central low area 162. In the embodiments of FIGS. 2–3 and 6–7, the low area 162 comprises the V-juncture of the sloping floor sections 160. Solids or dirt in the cooled evaporative liquid in the basin 22 will settle at the low area or point 162. From the low area or point 162, the solids or dirt can be removed through a drain, shown at 163 in FIGS. 2–3, 6–7 and 22

Each sloping floor section 160 of the illustrated embodiment is defined by three floor panels, designated 164 and 166 in FIGS. 6–7. Depending on the size of the basin, one or more of the floor panels 164 may have the same structure as the wall panels 60, with three strengthening sections 62 and connecting sections 64 connecting the strengthening sections 62, and made by pultrusion. The other two floor panels 166 each have a similar structure, and are also made by pultrusion. Each of these floor panels 166 has four box beam strengthening sections 168 joined by three connecting sections 170. These two floor panels 166 are the same, and only one will be described; it should be understood that the description applies as well to the other of these two floor panels.

A sample floor panel 166 is shown in FIG. 13. As there shown, the four box beam strengthening sections 168 are all hollow, with inner dimensions of about 35 mm by 35 mm. The connecting sections 170 of both panels are solid, each having a thickness of about 3 mm. The outer walls of the box beams joining the connecting sections 170 are flared outward slightly and the joints 172 between these walls of the box beams and the connecting sections are thickened somewhat to strengthen the junctions of the box beams and connecting sections. These flared and thickened areas may be defined by woven reinforcement material embedded concurrently in the connecting section and beam section during manufacture. This makes the joint between the beam sections and connecting sections extremely strong, light and cost effective. It should be understood that the above dimensions are provided for purposes of illustration only, and that the invention is not limited to any particular dimension.

The box beam strengthening sections 168 of these floor panels 166 may have complementary indentations 174 and protrusions 176 like those on the wall panels 60. Dimensions and angles for the walls may be similar to those described above for the wall panels 60. As can be seen from a comparison of FIGS. 12 and 13, the height of the floor panel of FIG. 13 is greater than the height of the floor panel of FIG. 12. Use of various combinations of these two forms of panel should produce an adequate variety of basin widths. It should be understood that it could be possible to make each floor section 160 with all one type of panel, either of the type shown in FIG. 12 or the type shown in FIG. 13, or with various combinations on these types of panels, depending upon the desired dimensions for the basin.

Regardless of which type or combination of types of panels are selected for each floor section 160, all of the floor panels are preferably bonded together with bonding material between the abutting beam surfaces. Sufficient bonding material should be used to also seal the joints or seams between the panels, shown at 178 in FIGS. 6–7, so that the floor sections 160 are water-tight. The protrusions and indentations 176, 174 or 88, 90 provide for accurate joining of the panels. The connections between the abutting panels are preferably bonded with the same epoxy used for the other joints of the cooling tower, using the same manner of surface preparation. Sufficient bonding material should be used so that the joints between the panels are sealed to prevent leakage.

In the embodiments of FIGS. 6–7, the two floor sections 160 are joined by an elongate keel 180, as shown in FIG. 16. As shown in FIG. 17, the keel 180 comprises angled upper walls 182 and angled lower walls 184 joined by a straight vertical center wall 186. In the embodiments illustrated in FIGS. 2–3, 6–7 and 16, the center of the keel along the straight center wall 186, at the linear intersection 187 of the two upper walls 182 is horizontal, and defines the low point 162 of the basin for water collection; the sloped upper and lower walls 182, 184 define the angle of slope for the floor sections 160. In the illustrated embodiment, the upper and lower keel walls 182, 184 are both sloped about 10° from the horizontal, with both keel walls 182, 184 sloping upward from the vertical center keel wall 186. As shown in FIG. 16, one floor section 160 is received between the upper and lower keel walls 182, 184 on one side of the straight center keel wall 186 and the other floor section 160 is received between the upper and lower keel walls 182, 184 on the other side of the straight center keel wall 186. The distance between the inner surfaces of the upper and lower keel walls 182, 184 is great enough to receive the box beams of the floor sections, about 40 mm in the illustrated embodiment. The connections between the floor sections 160 and the keel 180 are preferably bonded with the same epoxy used for the other joints. Sufficient bonding material should be used so that the joints between the keel and the floor sections are sealed to prevent leakage. Surface preparation may be as described above for other bonded joints.

The basin 22 also includes an elongate edge piece 190 along the opposite dimension of each floor section 160. As shown in FIGS. 14–15, each edge piece 190 comprises upper and lower walls 192, 194 joined by a side wall 196. Each upper and lower wall 192, 194 defines an angle of about 10° with the horizontal, and the side wall 196 is substantially vertical. One edge of the floor section opposite the keel 180 is received between the upper and lower walls 192, 194 of the edge piece 190. The top surface of the floor section fits against the inner surface of the upper wall 192, and the opposite surfaces of the box beams 168 fit against the inner surface of the lower wall 194, with bonding material between the surfaces. The bonding material may be the same material used for other joints, and a sufficient amount is preferably used to create a water-tight joint. Surface preparation may be as for other bonded joints.

As shown in FIGS. 6–7, each edge piece 190 abuts one of the lower walls 46 of the cooling tower. Preferably, the joint includes bonding material between the vertical side wall 196 and the inner surface 68 of the lower wall 46 in an amount sufficient to create a water-tight joint. Similar water tight joints are at the junctions of the edge pieces 190 and the columns 14. Compression fasteners may be used to make the initial connections between the floor section assemblies and the lower walls of the cooling tower, to insure that the proper spacing is maintained as the bonding material sets.

The edges of the end floor panels of each floor section 160 may also be bonded to the adjacent lower wall 46 to create a water-tight seal, along lines shown at 198 in FIGS. 6–7. The same epoxy used for the other joints may be used for this seal. Compression fasteners may be used, and surface preparation may also be as described above for other bonded joints.

Both the illustrated edge piece 190 and keel 180 comprise fiber reinforced resin material, and are preferably pultruded.

The intersection 187 of the upper walls 182 of the keel 180 may define a surface or a line. The intersection 187 may be substantially horizontal, in which case the entire intersection 187 defines the low point 162 of the basin. The intersection of the vertical wall 196 and top wall 192 of the edge piece 190, shown at 197 in FIGS. 6–7 and 14–15, may also be substantially horizontal. Alternatively, the floor sections 160 may be mounted so that the keel intersection 187 slants toward a single location at one end that defines the low point 162. The drain 163 would be located at that single location. The edge piece 190 intersection 197 would also be slanted in parallel to the slant of the keel intersection 187. The keel could have other designs as well; for example, the two upper walls 182 may have double slopes, sloping not only toward the intersection 187 between them but also sloping toward a low point at a single location.

An alternate design for a basin is shown in FIG. 22. In that embodiment, there is no keel. Instead, the floor panels 164 slant toward a low point 162 along one of the lower walls 46 and the high point is along the opposite lower wall 46. The edge piece intersection 197 on the lower edge piece 190 defines the low point 162. The low point 162 may comprise a line if the edge piece 190 is set horizontal, or may comprise a point at one end of the edge piece if the edge piece 190 is positioned to slant toward one end. The drain 163 and evaporative liquid outlet 161 are at the low point 162.

The illustrated designs of the basin 22 for the cooling tower are particularly advantageous. Not only do the basin designs allow for a sloping floor for drainage of the cooled liquid received from the heat exchange media, but the columns may still be supported on a flat surface, as shown in FIGS. 2–3. In addition, instead of a structure laid up or molded in a traditional fashion, the basin 22 of the present invention is made of pultruded components that can be easily shipped as pieces and assembled on site. It should be understood that although the illustrated basin designs are advantageous, the other features of the cooling tower may be used with other basin designs, and the invention is not limited to a particular basin design unless expressly set forth in the claims. Moreover, the illustrated basin designs could also find potential use with other heat exchanger designs, and the invention is not limited to a particular heat exchanger frame design unless expressly set forth in the claims.

To cool the liquid before it reaches the basin, the illustrated cooling tower uses the fan 26 to draw air into the air intake openings 24 between the upper walls 16 and lower walls 46. The induced air draft travels upward through the heat exchange media 20 and continues upward through the drift eliminators 142, to the fan 26. The fan is surrounded by the shroud 30 that is open at its top as an outlet for the draft of air to the surrounding environment. The shroud 30 may be made of fiber reinforced resin material in a conventional manner and assembled on top of the roof deck 32. The fan 26 is of a conventional propeller blade type. The fan 26 is mounted on a shaft held in an assembly of bearings in a supporting frame 200. The fan shaft is driven by a drive mechanism 202, such as a belt drive, which is driven by the motor 28. The shroud 30, roof deck 32, fan 26 and motor 28 may be of any conventional design. In the illustrated embodiment, the roof deck 32 and shroud 30 comprise four molded fiber reinforced resin segments that are joined and supported on the tops 44 of the four columns 14. Other structures may be used as well; for example, a roof deck or shroud could be made of one piece, two pieces, three pieces, or more than four pieces. The mechanical equipment, that is the motor 28 and bearing and shaft assembly 200, are supported in the illustrated embodiment by two spaced parallel horizontal members 204 (one is shown in FIGS. 2–3) which carry bearing supports for the bearing and shaft assembly 200 and a support for the motor 28. The ends of the horizontal members 204 extend through openings in the fan shroud 30 and rest on ledges in the roof deck 32.

The cooling tower may have other features as well. For example, as is conventional, a ladder (not shown) may be provided along one side of the tower for access to the motor 28 and fan 26 and the roof deck 32. In some instances, it may be desirable to provide an access door for access to the interior of the cooling tower. To allow for such an access door, or to provide additional support for the roof deck, the cooling tower may include one or more beams between the columns. As shown in FIG. 18, the beams 210 may be joined to the columns 14 with mounting members 212 that extend over and are bonded to both the beam 210 and the column 14 with the same bonding material used for the other joints, and with mechanical fasteners to bear the load until the bonding material has set and to properly position the surfaces to be joined. The mounting members 212 may comprise flat plates as illustrated in FIG. 19, or may comprise more complex three-dimensional structures as illustrated in FIG. 20. The mounting members 212 may be made of stainless steel, such as 12 gauge stainless steel, or may be made of fiber reinforced resin material. If made of fiber reinforced resin material, elongate fibers may be used rather than chopped fibers, with the fibers oriented so that they run horizontally when the mounting member 212 is bonded to the columns 14 and beams 210. The mounting members 212 may have predrilled holes 214 for the mechanical fasteners.

The wall panels 60 and floor panels 164, 166 may be pultruded in long form and then cut to the desired length for the particular cooling tower design, and then the location holes for the compression fasteners may be pre-drilled. For ease of shipping, the components may be shipped as a kit in a knocked-down form with fasteners and bonding material for assembly on site. Assembly is as described above, with surface preparation and application of uncured bonding material at the joints and insertion of compression fasteners. The compression fasteners will bear the load until the bonding material has cured. The above-identified epoxy material will generally achieve 80% of its strength within a 2 to 4 hour period, and will generally reach full strength within a 28 to 48 hour period. These times can vary due to specific installation conditions.

Tests have been performed on joints 42 and 51 between columns and walls of the type illustrated in FIGS. 4–6. In these walls, the strengthening ribs 108 were formed integral with the connecting sections 64, as shown in FIG. 21. Compression fasteners 220 were used to hold the wall panels against the columns until the bonding material set. The number of compression fasteners 220 used varied from a total of 18 to a total of 30. In one test, 30–4.8 mm (3/16 in.) aluminum rivets were used instead of compression fasteners. The wall had a width of 300 mm and a height of 1,435 mm. For two of the tests, the walls were bonded to two columns of 75 mm square hollow section, each having a length of 1,930 mm. The surface area for the joint along each face of the square column was 100,435 mm². In the third test, with the aluminum rivets, the wall was bonded to two long fiberglass angles with 75 mm legs. In the third test, the surface area of the bonded joint was 103,320 mm². In the third test, the angles were more flexible than the square columns, and the surfaces defining the wall were not sanded prior to bonding. In the test, one square column or angle was fixed to a frame of a testing machine, with the bottom end of the square column or angle resting on a cross-member of the test machine frame. The other square column or angle was not supported at its bottom end, and a load was applied at its top end. The test structures were not otherwise restrained. The principal loading of the walls was one of vertical shear, although some bending and twisting occurred at higher loads. Increased loading was applied under slow deformation control, and continued beyond the point at which the peak load occurred. Deformation was measured as the vertical translation or deflection of the actuator. In both the first and second tests, failure was by delamination of the strengthening ribs 108 rather than through failure of the bonded joints with the square columns. The peak load for the primary test was 103 kN, creating a vertical deflection of 11 mm, resulting in an average shear stress between the wall and the outer column of 1.03 MPa (149 psi) at the peak load. Slight twisting was noticed at 58 kN. The peak load for the second test was 83.4 kN at an actuator deflection of 12.5 mm. The average shear stress on the bonded joint between the wall and the outer column was 0.83 MPa (120 psi) at the peak load. Twist and slight delamination was visible at 70 kN. Twist displacement reached 30 mm at the lower end of the columns at 80 kN. Failure at 83.4 kN was localized at the bottom edge of the wall, by delamination of the 3 lower strengthening ribs, with some localized peeling of the wall from the column at the same bottom corner. In the third test, strong twist was evident from the start of loading, increasing to very high levels without any general failure. The peak load was 36.3 kN, but failure was minor and highly localized between the leg of the angle and the wall. The average shear stress on the outer bonded joint between the angle and the wall was 0.35 MPa (51 psi) at the peak load sustained by the panel.

Given that typical design shear loads on the joints between the columns and walls may be on the order of 1.0 MPa for wind or 0.6 MPa, for other live loads such as earthquake loads, including appropriate safety factors, such joints between the columns and walls should meet design criteria. Moreover, the preferred wall panels, with integrally pultruded strengthening sections 62 and connecting sections 64 and with box beam strengthening sections, should have greater strength than the tested wall panels, allowing for even greater design flexibility.

Figure 27:
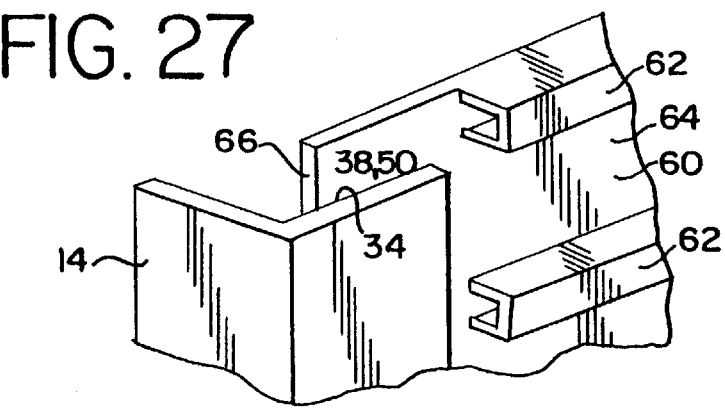
FIG. 27 is a perspective view of part of an alternate column design and part of an alternate wall panel design for a heat exchanger.

It should be understood that as used herein, a "column" need not be a four-sided enclosed structure. As used in the claims, a column may comprise an upright angle member or an upright channel member, for example. Examples of alternative column designs are illustrated in FIGS. 23–27. As shown in FIG. 23, each column 14 could comprise a pultruded structure with channels 230 between legs 232 to receive the wall panel 60, with the inner surface of one of the legs comprising the mounting surface 34 of the column. And instead of mechanical fasteners, a temporary wedge 234 could be used to hold the mounting surfaces 34, in proper position until the bonding material sets. The columns 14 could have recessed ledges 236 defining the mounting surfaces 34, as shown in FIG. 24. The columns could have preformed slots 238 defining the mounting surface 34, or providing two mounting surfaces, to be bonded to one or two mounting surfaces 38, 50 of the wall panel 60, as shown in FIG. 25. As shown in FIG. 26, the wall panel 60 and column 14 may have mating indentations 240 and protrusions 242 for twist strength, or both the column 14 and the wall panel 60 could have indentations 240, 241 with an elongate shear and seal member 244 received in the indentations 240, 241. If an angle member is used for the column 14, as shown in FIG. 27, the wall panel 60 could be bonded to an inside surface of the angle member, with the inside surface serving as one mounting surface 34 of the column. Thus, the mounting surfaces 34 of the columns 14 can be outside surfaces, but can also be inside surfaces. In each of the embodiments of FIGS. 23–27, bonding material would be disposed between the mating mounting surfaces 34, 38, 50 to create rigid joints and rigid structures as described above. The same types of mechanical fasteners described above, and the same surface preparation, may be used.

Figure 28:
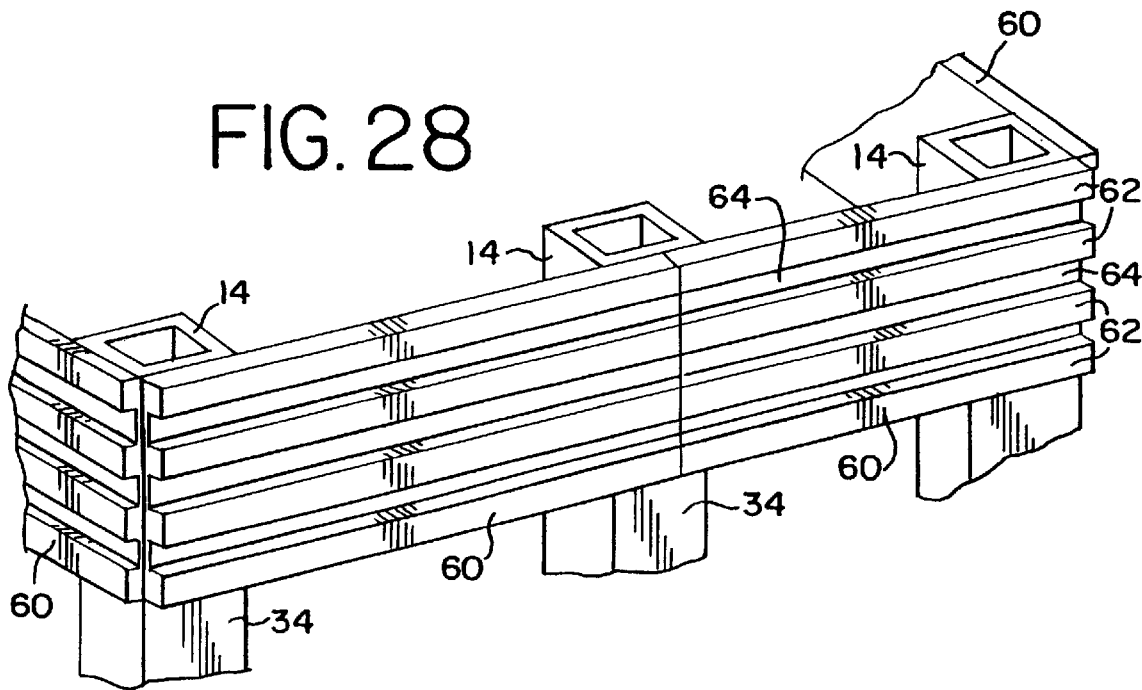
FIG. 28 is a perspective view of a portion of an alternate heat exchange apparatus structure.

As shown in FIG. 28, heat exchangers could be made with one or more additional columns 14 between corner columns. As shown, each middle column could be bonded to the ends of two wall panels 60. The middle column could also be bonded to a single continuous wall panel extending from one end column to the other end column.

While only specific embodiments of the invention have been described and shown, it is apparent that various alternatives and modifications can be made thereto, and that parts of the invention may be used without using the entire invention. Those skilled in the art will recognize that certain modifications can be made in these illustrative embodiments. It is the intention in the appended claims to cover all such modifications and alternatives as may fall within the true scope of the invention.

We claim:

1. A heat exchanger comprising:
    a plurality of structural members made of a fiber reinforced resin material, the structural members including a plurality of substantially vertical columns and a plurality of walls, said columns being spaced apart and including mounting surfaces and having lengths, each wall extending between two columns and including a pair of spaced parallel substantially vertical edges with a mounting surface along each edge, each wall further including at least one non-vertical strengthening section;
    a first joint comprising at least a portion of the mounting surface of one column, the mounting surface of one wall, and a bonding material, the two mounting surfaces lying in a face-to-face overlapping relationship with the bonding material between them, the face-to-face mounting surfaces and bonding material of the first joint extending along a substantial part of the length of the column, the bonding material extending across substantial parts of the widths of the overlapping mounting surfaces;
    a second joint comprising at least a portion of the mounting surface of a second column, the opposite mounting surface of said one wall, and a bonding material, the two mounting surfaces lying in a face-to-face overlapping relationship with the bonding material between them, the face-to-face mounting surfaces and bonding material of the second joint extending along a substantial part of the length of the second column, the bonding material extending across substantial parts of the widths of the overlapping mounting surfaces; and
    a heat exchange media within the heat exchanger;
    wherein the first and second joints have design load capacities at least as great as the anticipated loads on the first and second joints.

2. The heat exchanger of claim 1 wherein said first and second joints further include mechanical fasteners extending through the mounting surfaces of the wall and columns.

3. The heat exchanger of claim 1 wherein each mounting surface of each column has a width extending substantially across one dimension of the column and wherein each mounting surface of said wall covers at least a substantial part of the width of each column mounting surface.

4. A heat exchanger comprising:
    a plurality of structural members made of a fiber reinforced resin material and including a plurality of substantially vertical columns and a plurality of walls, said columns being spaced apart and including mounting surfaces, each wall extending between two columns,
    each wall including a panel comprising a pair of strengthening sections and an integral connecting section extending between the strengthening sections, the strengthening sections and the connecting section having two integral spaced mounting surfaces, each mounting surface disposed in a face-to-face relationship with at least a part of the mounting surface of one column;
    bonding material between the mounting surfaces of the columns and panel to bond the columns and panel together;
    a second panel comprising a pair of strengthening sections and an integral connecting section extending between the strengthening sections, the strengthening sections and the connecting section of the second panel having two integral spaced mounting surfaces, each mounting surface disposed in a face-to-face relationship with the mounting surface of one column, the first and second panels having abutting strengthening sections;
    bonding material between the mounting surfaces of the columns and second panel to bond the columns and second panel together;
    bonding material between the abutting strengthening sections of the first and second panels to bond the first and second panels into an integral structure with substantially no relative movement between the panels at design loads; and
    heat exchange media within the heat exchanger.

5. The heat exchanger of claim 4 wherein the two mounting surfaces of each panel are substantially parallel to each other and each mounting surface runs along an entire dimension of the panel.

6. The heat exchanger of claim 4 wherein each strengthening section comprises a hollow box beam.

7. The heat exchanger of claim 4 further comprising an evaporative liquid distribution system for distributing evaporative liquid within the heat exchanger above the heat exchange media, a basin positioned below the heat exchange media to receive evaporative liquid, and supports attached to at least two walls for supporting the heat exchange media at a vertical level above the basin, the walls being bonded to the columns at a vertical level above the level of the heat exchange media, the heat exchanger further including an air intake below at least one wall and above the basin, the heat exchanger further including a plurality of walls surrounding the basin and attached to the columns below the level of the air intake.

8. The heat exchanger of claim 4 further comprising mechanical fasteners extending between each panel and each column.

9. A heat exchanger comprising:
    a plurality of structural members made of a fiber reinforced resin material, the structural members including a plurality of substantially vertical columns and a plurality of walls, the columns being spaced apart and including mounting surfaces and having lengths, each wall extending between a pair of vertical columns and having ends at the vertical columns, each wall including a middle substantially horizontal beam, an upper substantially horizontal beam, a lower substantially horizontal beam, an upper connecting web extending between the middle beam and upper beam and a lower connecting web extending between the middle beam and lower beam, each beam having upper and lower non-vertical surfaces and inner and outer substantially vertical surfaces, each connecting web having an inner surface, the inner surfaces of the connecting webs and beams being co-planar at the ends of the wall and lying face-to-face with at least a part of the mounting surfaces of columns, the heat exchanger including bonding material disposed between the mounting surfaces of the columns and the facing co-planar surfaces of the beams and connecting webs;

wherein the co-planar mounting surfaces of the beams and connecting webs of the wall, the bonding material and the mounting surfaces of the columns define joints having design load capacities at least as great as the anticipated loads on the joints;

the heat exchanger further including a heat exchange media within the heat exchanger.

10. The evaporative heat exchanger of claim 9 further including mechanical fasteners extending between the wall panel and the columns at the ends of the wall panel.

11. The evaporative heat exchanger of claim 9 wherein one of the non-vertical surfaces of one of the beams of one wall panel abuts one of the non-vertical surfaces of one of the beams of another wall panel, the evaporative heat exchanger including bonding material disposed between the abutting non-vertical surfaces of the two wall panels.

12. The evaporative heat exchanger of claim 11 wherein the abutting non-vertical surfaces of the wall panel and second panel have complementary protrusions and indentations.

13. A evaporative heat exchanger comprising:

an evaporative liquid distribution system for distributing evaporative liquid within the evaporative heat exchanger;

a heat exchange media within the evaporative heat exchanger and positioned to receive evaporative liquid from the evaporative liquid distribution system; and a basin positioned to receive evaporative liquid from the heat exchange media, the basin comprising a sloping floor including a basin floor panel made of pultruded fiber reinforced resin material;

wherein the basin floor panel includes strengthening sections and a connecting section extending between the strengthening sections, the strengthening sections comprising hollow box beams and the connecting section comprising a solid web.

14. The evaporative heat exchanger of claim 13 wherein the basin has two sloping floors meeting at a low point.

15. The evaporative heat exchanger of claim 13 further comprising a plurality of walls and an edge member made of fiber reinforced resin material extending across one dimension of the basin floor panel and bonded to the basin panel, the edge member being bonded to one wall.

16. The evaporative heat exchanger of claim 14 further comprising a second basin floor panel having a sloping surface disposed below the heat exchange material and lying in a plane intersecting the plane of the sloping surface of the first basin floor panel, the evaporative heat exchanger further comprising a keel member joining the two basin floor panels, the keel member being bonded to the two basin floor panels and defining the low point of the basin so that evaporative liquid received in the basin flows toward the keel member.

17. The heat exchanger of claim 13 further comprising a drain and an outlet at the low point of the sloping floor.

18. The heat exchanger of claim 13 wherein the heat exchanger includes a pair of walls and wherein the floor slopes from a high point along one wall to a low point along another wall.

19. A heat exchanger including an outer casing and a heat exchange media inside of the outer casing, the casing comprising:

a plurality of vertical fiber reinforced, pultruded casing corner columns, each corner column including two intersecting planar surfaces facing toward the exterior of the heat exchanger, said exterior facing surfaces comprising column mounting surfaces;

a plurality of horizontally oriented, fiber reinforced, pultruded wall panels, each wall panel having panel mounting surfaces corresponding with the column mounting surfaces of two columns;

a bonding material interposed between the corresponding panel mounting surfaces and column mounting surfaces to bond said corresponding mounting surfaces together.

20. A heat exchanger comprising:

a plurality of structural members made of a fiber reinforced resin material, the structural members including a plurality of substantially vertical columns and a plurality of walls, said columns being spaced apart and including mounting surfaces and having lengths and transverse dimensions, each wall extending between two columns and including a pair of spaced parallel substantially vertical edges with a mounting surface along each edge, each wall further including at least one horizontally-extending strengthening section;

a first joint comprising at least a portion of the mounting surface of one column, the mounting surface of one wall, and a bonding material, the two mounting surfaces lying in a face-to-face overlapping relationship with the bonding material between them, the face-to-face mounting surfaces and bonding material of the first joint extending along a substantial part of the length of the column, the overlapping mounting surfaces having a transverse dimension;

a second joint comprising at least a portion of the mounting surface of a second column, the opposite mounting surface of said one wall, and a bonding material, the two mounting surfaces lying in a face-to-face overlapping relationship with the bonding material between them, the face-to-face mounting surfaces and bonding material of the second joint extending along a substantial part of the length of the second column, the bonding material extending across substantial parts of the widths of the overlapping mounting surfaces, the overlapping mounting surfaces having a transverse dimension; and a heat exchange media within the heat exchanger;

wherein the widths of the overlapping mounting surfaces are at least one-half of the transverse dimension of the corresponding column in a plane parallel to the mounting surface of the wall;

wherein the first and second joints have design load capacities at least as great as the anticipated loads on the first and second joints.

21. An evaporative heat exchanger comprising:

a plurality of structural members made of a fiber reinforced resin material, the structural members including a plurality of substantially vertical columns and a plurality of substantially horizontal beams, the columns being spaced apart and including mounting surfaces and having lengths, the substantially horizontal beams including an upper and a lower beam extending between one pair of columns, each beam having upper and lower non-vertical surfaces and inner and outer substantially vertical surfaces and an integral mounting surface at each end of the beam, the integral mounting surfaces of each beam being substantially co-planar with one of the vertical surfaces of that beam;

the mounting surfaces of the beams overlapping the mounting surfaces of the two columns, the heat exchanger including bonding material between the overlapping mounting surfaces of the beams and columns;

the evaporative heat exchanger further including a heat exchange media within the evaporative heat exchanger;

wherein the integral mounting surface of at least one of the beams extends vertically beyond the non-vertical surfaces of that beam; and wherein the widths of the overlapping mounting surfaces are at least one-half of the transverse dimension of the corresponding column in a plane parallel to the mounting surface of the beam.

* * * * *